Dec. 3, 1929.  E. R. WALKER ET AL  1,737,901
CARRIER FOR RUNNING BOARDS
Filed July 25, 1927
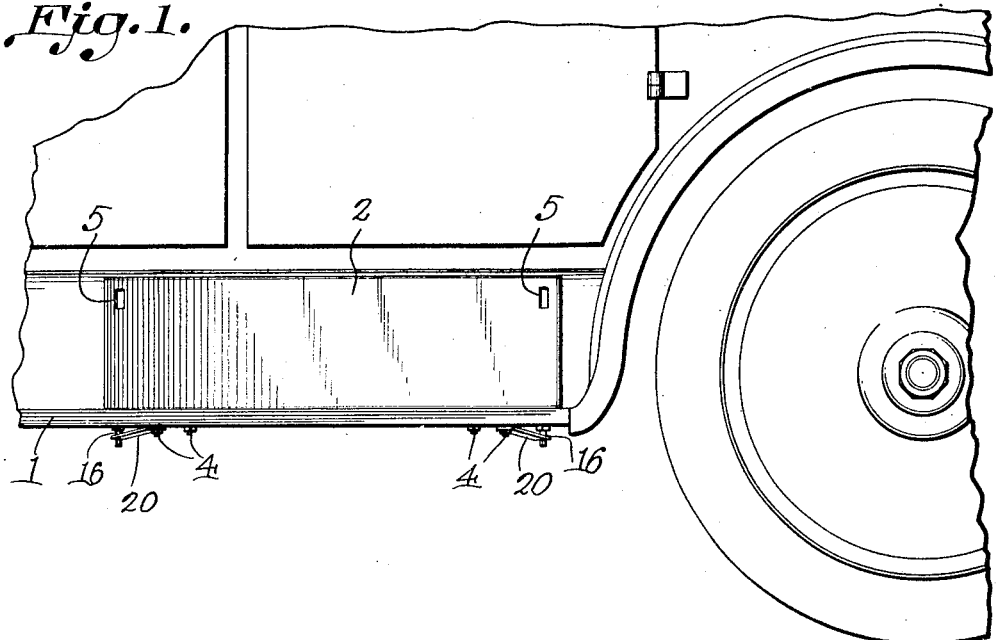
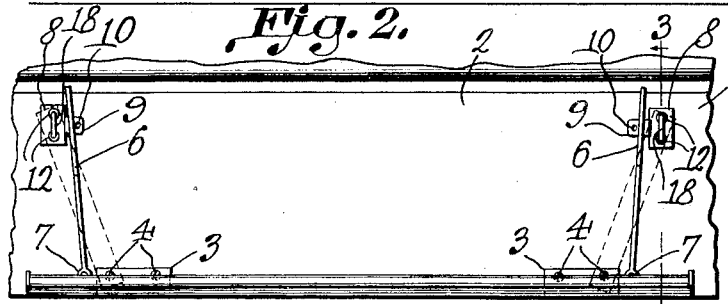
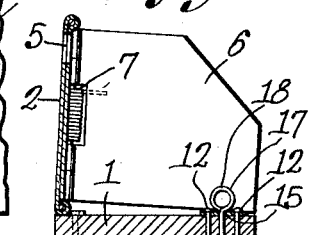
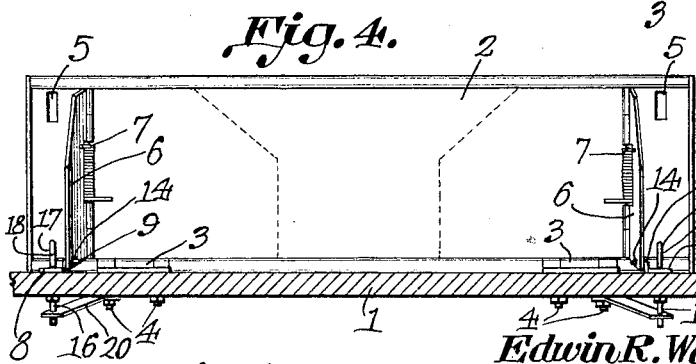
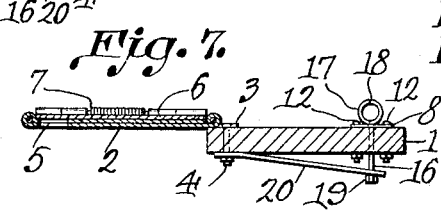
Edwin R. Walker and
Dennie B. Henley
Inventor
By C. A. Snow & Co.
Attorneys Patented Dec. 3, 1929

1,737,901

UNITED STATES PATENT OFFICE

EDWIN R. WALKER AND DENNIE B. HENLEY, OF YAKIMA, WASHINGTON

CARRIER FOR RUNNING BOARDS

Application filed July 25, 1927. Serial No. 208,244.

This invention aims to provide a novel luggage carrier for mounting on the running board of an automobile, novel means being provided for holding the device in working position and in inoperative position, the construction being such that the article will not be objectionable either on account of peculiarities of appearance, or on account of bulk.

In the drawings:—Figure 1 shows in side elevation, a part of an automobile whereunto the device claimed has been applied; Figure 2 is a plan, the panel being turned up into holding position; Figure 3 is a section taken about on the line 3—3 of Figure 2; Figure 4 shows the device in elevation, the panel being in holding position, the running board appearing in section; Figure 5 is a perspective view of the bracket; Figure 6 is a section showing how the device appears when folded and not in use; Figure 7 is a sectional view disclosing how the article may be used for a table.

The running board of an automobile is shown at 1, and the numeral 2 marks a panel which may be made of metal, and of the double-walled construction shown in Figures 3, 6 and 7. The panel 2 is connected to the running board 1, at a point near to the outer edge of the running board, by hinges 3. The securing elements that connect the hinges 3 with the running board 1 are marked by the numeral 4, because one of them has an additional function which will be made manifest hereinafter. Near to its free corners, the panel 2 is supplied with openings or seats 5. Wings 6 are joined to the panel 2 by spring hinges 7, the wings being set in a little from the ends of the panel, as shown in Figure 4. Brackets 8 are provided and have off-set keepers or stops 9 equipped with openings 10. There are openings 11 in the brackets 8, the said openings being adapted to receive securing elements 12, such as bolts, which fasten the brackets 8 to the running board 1 near to the outer edge of the running board. Near to their outer corners, the wings 6 have holes 14 for the reception of the ends of the keepers or stops 9. The brackets 8 have apertures 15 in which slide the shanks 16 of latches 17, each latch having an enlarged head 18 at its upper end, and an enlargement 19 at its lower end. The shanks 16 of the latches 17 can slide lengthwise and turn in the brackets 8 and in the running board 1 and in the outer ends of spring tongues 20 through which the shanks 16 of the latches 17 pass, the enlargements 19 engaging the spring tongues 20. The rear ends of the spring tongues 20 are held on the running board 1 by divers of the securing elements 4.

When the device is in use, as shown in Figures 1, 2, 3, and 4, the panel 2 stands almost at right angles to the running board 1, the wings 6 are disposed at right angles to the panel 2 and to the running board 1, the ends of the keepers 9 extend through the holes 14 of the wings 6, and if desired, pegs or nails (not shown) may be dropped into the openings 10 of the keepers 9 to hold the wings 6 positively in place. This is not insisted upon, because the spring hinges 7 tend to hold the wings 6 engaged with the keepers 9, and as soon as the panel 2 is swung up into an approximately vertical position, the spring hinges 7 tend to open the wings 6 and engage them with the keepers 9. It is clear that when the panel 2 and the wings 6 upstand from the running board 1, as shown in Figures 2 and 4, a compartment will be formed on the running board, wherein packages may be stowed. At this point, it may be pointed out that the panel 2 may be of any desired length.

When the occasion for the use of the device has passed, the wings 6 are disengaged from the keepers 9 and are swung on the hinges 7 into approximate parallelism with the panel 2. The panel 2 and the folded wings 6 then are swung down on the hinges 3 until the parts 6 and 2 are parallel to the running board 1, as shown in Figure 6. Whilst the panel is being folded down, the heads 18 of the latches 17 are arranged as shown in Figure 3, parallel to the openings 5 in the panel 2, so that when the panel is folded down, the heads 18 will pass through the openings 5. The latches 17 then are raised a little, and given a quarter turn, so that the heads 18 of the latches extend crosswise of the openings 5, as indicated in Figure 6. The spring tongues 20 are under tension and tend to pull the latches 17 down so that the heads 18 of the latches bear on the folded panel 2 and keep it from rattling. When the panel 2 is folded, as in Figure 6, the panel takes up but little room on top of the running board 1, and the panel is strong enough so that it can be trodden upon and scuffed without receiving appreciable damage. The panel, therefore, when folded, serves as a protector for the running board.

One of the securing elements 4 has two functions, in that it holds both the hinge 3 and the tongue 20. The bracket 8 has two functions in that it carries the keeper or stop 9 for the wing 6, and also acts as a wear-resisting guide in which the shank 16 of the latch 17 reciprocates.

During the eating of a meal, or while making repairs to the car, the panel 2 may be swung outwardly from the running board 1, as shown in Figure 7, to serve as a table.

For convenience in claiming the invention, the running board 1 may be referred to as a base.

What is claimed is:—

In a device of the class described, a base, a combined stop and guide on the base, a panel having a seat, a hinge connected to the panel, a securing element uniting the hinge with the base, a wing hinged to the panel and movable into and out of engagement with the stop and guide, a latch slidable in the stop and guide, the latch having a head, a spring held on the base by the securing element, the latch being rotatable in the stop and guide, and in the spring, to permit the head to pass through the seat when the panel is folded on the hinge, and then engage the panel to hold it folded, the spring serving to slide the latch endwise in the stop and guide and to hold the head of the latch engaged with the folded panel.

In testimony that we claim the foregoing as our own, we have hereto affixed our signatures.

EDWIN R. WALKER.
DENNIE B. HENLEY.